United States Patent
Chien et al.

(10) Patent No.: US 9,348,085 B2
(45) Date of Patent: May 24, 2016

(54) LIGHT SOURCE MODULE

(71) Applicant: Au Optronics Corporation, Hsinchu (TW)

(72) Inventors: Chih-Wei Chien, Taoyuan County (TW); Zong-Huei Tsai, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 119 days.

(21) Appl. No.: 14/501,044

(22) Filed: Sep. 30, 2014

(65) Prior Publication Data

US 2015/0098245 A1    Apr. 9, 2015

(30) Foreign Application Priority Data

Oct. 3, 2013   (TW) .............................. 102135882 A
Mar. 7, 2014   (TW) .............................. 103107959 A

(51) Int. Cl.
*F21V 8/00* (2006.01)

(52) U.S. Cl.
CPC ............ *G02B 6/0096* (2013.01); *G02B 6/0051* (2013.01); *G02B 6/0055* (2013.01); *G02B 6/0058* (2013.01); *G02B 6/0078* (2013.01)

(58) Field of Classification Search
CPC .. G02B 6/0096; G02B 6/0051; G02B 6/0055; G02B 6/0058; G02B 6/0078
See application file for complete search history.

(56) References Cited

U.S. PATENT DOCUMENTS

| 5,453,855 | A | 9/1995 | Nakamura et al. |
| 7,726,828 | B2 * | 6/2010 | Sato ..................... G02B 6/0043 362/341 |
| 8,206,000 | B2 * | 6/2012 | Tung ................. G02F 1/133603 362/237 |

FOREIGN PATENT DOCUMENTS

| CN | 101135811 | 3/2008 |
| CN | 202660409 | 1/2013 |
| KR | 20110057518 | 6/2011 |
| TW | 583462 | 4/2004 |
| TW | 200949157 | 12/2009 |
| TW | 200949370 | 12/2009 |
| TW | I378573 | 12/2012 |

* cited by examiner

*Primary Examiner* — Mary Ellen Bowman
(74) *Attorney, Agent, or Firm* — Jianq Chyun IP Office

(57) ABSTRACT

A light source module includes a plurality of light emitting units, and each of the light emitting units includes a reflection plate, a light extraction plate, a sidewall structure, a light source, and a diffusion plate. The light extraction plate has a plurality of first holes, and the light extraction plate and the reflection plate are opposite to each other. The sidewall structure having a plurality of second holes is located between the reflection plate and the light extraction plate, and the reflection plate, the light extraction plate, and the sidewall structure together constitute a first light guiding cavity. The light source is located in the first light guiding cavity and adjoins the sidewall structure. The diffusion plate is located above the light extraction plate, and a second light guiding cavity is formed between the light extraction plate and the diffusion plate.

35 Claims, 10 Drawing Sheets

LIGHT SOURCE MODULE

CROSS-REFERENCE TO RELATED APPLICATION

This application claims the priority benefits of Taiwan application serial no. 102135882, filed on Oct. 3, 2013, and Taiwan application serial no. 103107959, filed on Mar. 7, 2014. The entirety of each of the above-mentioned patent applications is hereby incorporated by reference herein and made a part of specification.

BACKGROUND OF THE INVENTION

1. Field of the Invention

The invention relates to a light source module, and more particularly, to a light source module having two layers of light guiding cavities.

2. Description of Related Art

With the advancement of science and technology, bulky cathode ray tube (CRT) displays have gradually fallen into disuse. At present, liquid crystal displays (LCDs), organic light emitting diode (OLED) displays, electro-phoretic displays (EPDs), and plasma displays (PDPs) have little by little become the mainstream flat displays in the next generation.

In a conventional flat display, a direct-type backlight module characterized by 2D local dimming enhances the contrast of the display and economizes the power use; however, the direct-type backlight module requires a rather long light-mixing distance and therefore has a significant thickness. Compared to the direct-type backlight module, an edge-type backlight module has a small thickness, while the edge-type backlight module cannot perform the function of 2D local dimming. Accordingly, the backlight module of the conventional flat display is often required to sacrifice the function of 2D local dimming, suffer from the large thickness, or bear both of the above. Even though the direct-type backlight module equipped with splicing-type light guiding plates may be thinned down, splicing edges between/among the light guiding plates are apt to be shown on the display images due to the different luminance of each splicing-type light guiding plate, i.e., honeycomb or chessboard-like bright and dark zones may be generated in the non-irradiated regions, such that the display quality of the display is deteriorated.

SUMMARY OF THE INVENTION

The invention is directed to a light source module with small thickness and favorable display quality.

In an embodiment of the invention, a light source module that includes a plurality of light emitting units is provided, and each of the light emitting units includes a reflection plate, a light extraction plate, a sidewall structure, a light source, and a diffusion plate. The light extraction plate has a plurality of first holes, and the light extraction plate and the reflection plate are opposite to each other. The sidewall structure having a plurality of second holes is located between the reflection plate and the light extraction plate, and the reflection plate, the light extraction plate, and the sidewall structure together constitute a first light guiding cavity. The light source is located in the first light guiding cavity and adjoins the sidewall structure. The diffusion plate is located above the light extraction plate, and a second light guiding cavity is formed between the light extraction plate and the diffusion plate.

In another embodiment of the invention, a light source module that includes a plurality of light emitting units is provided, and each of the light emitting units includes a reflection plate, a light extraction plate, a sidewall structure, a light source, a diffusion plate, and a support structure. The light extraction plate has a plurality of first holes, and the light extraction plate and the reflection plate are opposite to each other. The sidewall structure is located between the reflection plate and the light extraction plate, and the reflection plate, the light extraction plate, and the sidewall structure together constitute a first light guiding cavity. The light source is located in the first light guiding cavity and adjoins the sidewall structure. The diffusion plate is located above the light extraction plate, and a second light guiding cavity is formed between the light extraction plate and the diffusion plate. The support structure is located between the light extraction plate and the diffusion plate.

In view of the above, due to the design of two layers of light guiding cavities in the light emitting units and the angle at which the light source is arranged, the total thickness of the cavities may be reduced, and the systematic light emitting efficiency may be improved. Furthermore, in comparison with the conventional edge-type light source module, the light source module provided herein may have the reduced thickness. When each of the light emitting units is lightened, the junctions where the lightened light emitting units and the adjacent non-irradiated regions are connected are less noticeable, and thereby the dark zones between/among the bright regions may be prevented.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
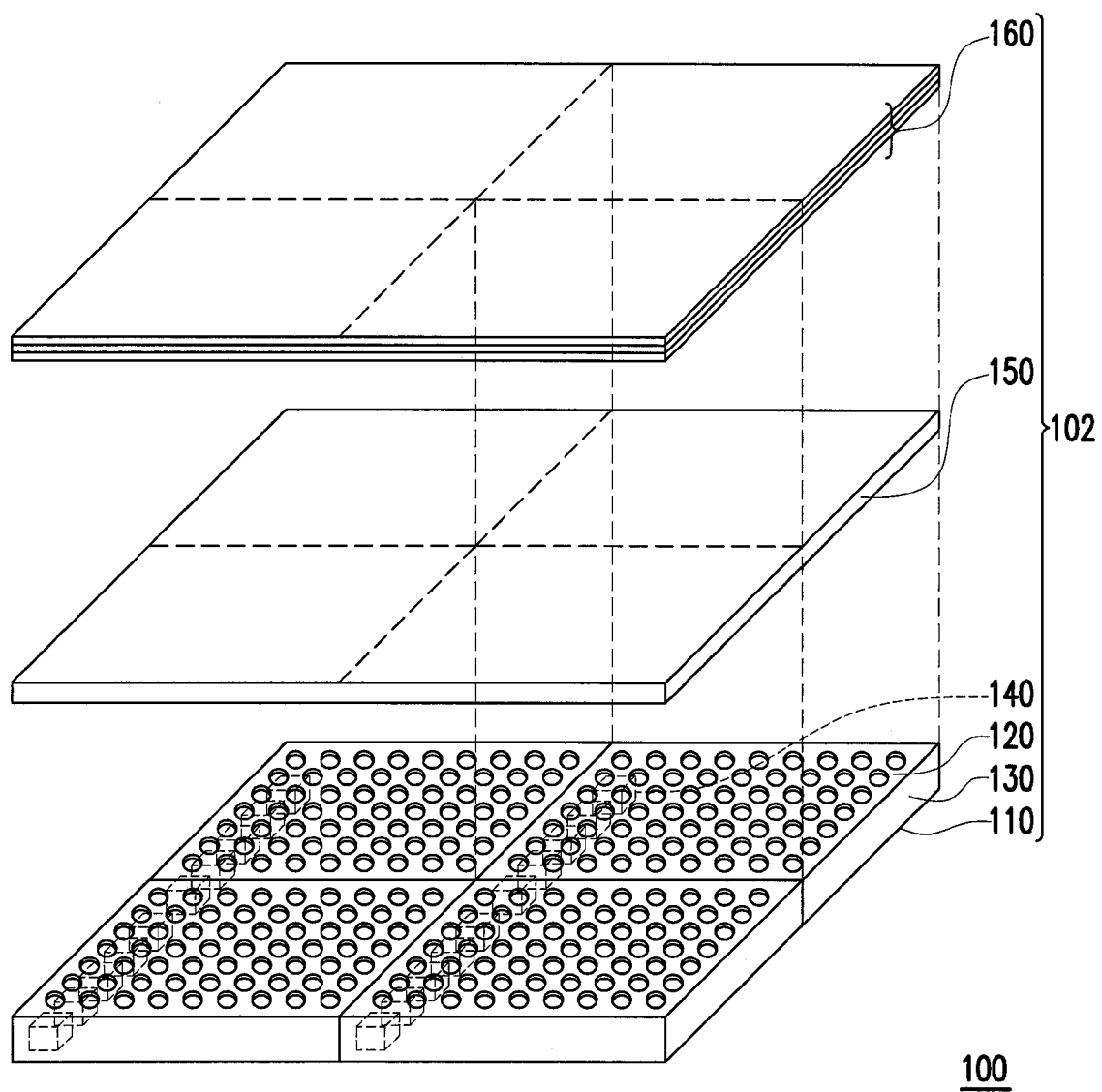
FIG. 1 is a three-dimensional diagram illustrating a light source module in an unfolded state according to an embodiment of the invention.
Figure 2:
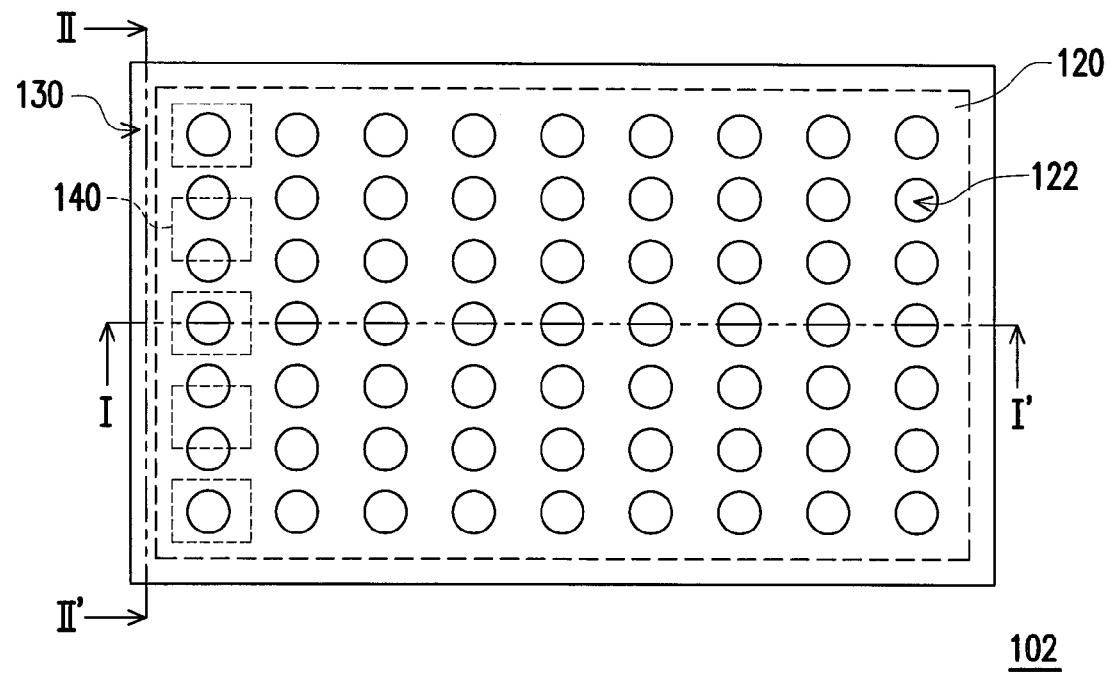
FIG. 2 is a schematic top diagram illustrating a light emitting unit according to a first embodiment of the invention.
Figure 3:
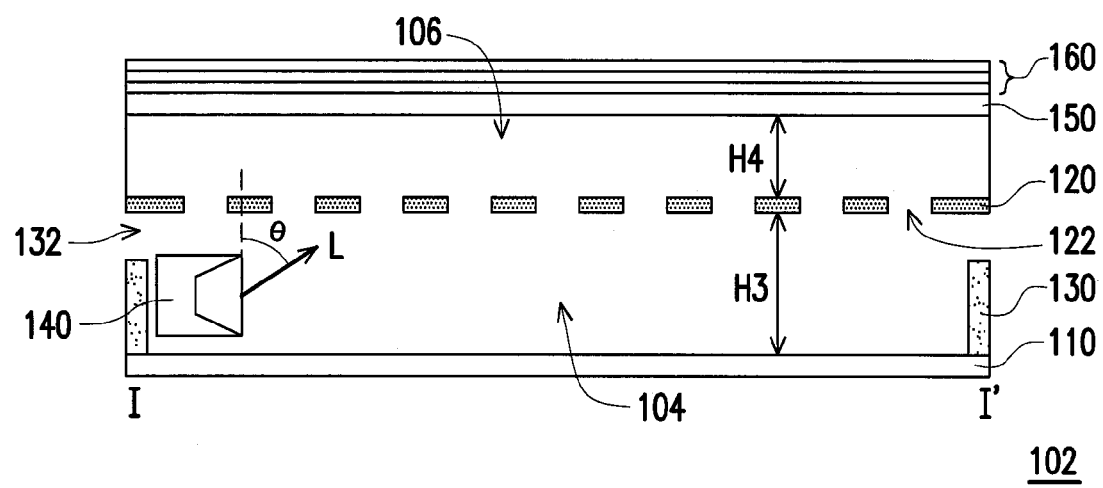
FIG. 3 is a schematic cross-sectional diagram illustrating the light emitting unit along a line I-I' depicted in FIG. 2.
Figure 4:
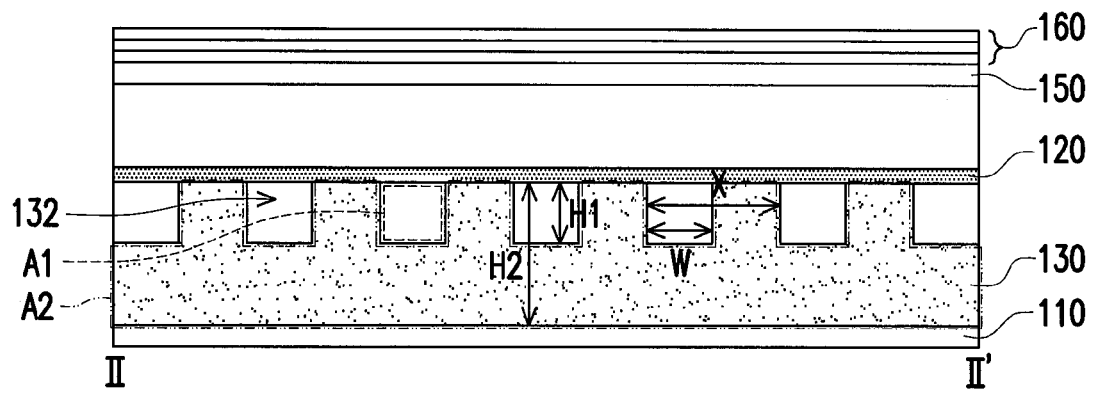
FIG. 4 is a schematic cross-sectional diagram illustrating the light emitting unit along a line II-II' depicted in FIG. 2.

FIG. 1 is a three-dimensional diagram illustrating a light source module in an unfolded state according to an embodiment of the invention. FIG. 2 is a schematic top view illustrating a light emitting unit according to a first embodiment of the invention. FIG. 3 and FIG. 4 are schematic cross-sectional diagrams respectively illustrating the light emitting unit along a line I-I' and a line II-II' depicted in FIG. 2.

With reference to FIG. 1 to FIG. 4, the light source module 100 includes a plurality of light emitting units 102. The light source module 100 is a backlight module of an LCD or a light source module of any other appropriate flat display, for instance. To clearly illustrate the embodiment of the invention, the light source module 100 in FIG. 1 merely includes four splicing-type light emitting units 102, and FIG. 2 to FIG. 4 merely illustrate one of the light emitting units 102 in the light source module 100 depicted in FIG. 1. It should be known to people skilled in the art that the light source module 100 depicted in FIG. 1 in fact includes a plurality of splicing-type light emitting units 102 shown in FIG. 2 to FIG. 4, and the effects of highly dynamic contrast may be achieved by local control.

Each of the light emitting units 102 includes a reflection plate 110, a light extraction plate 120, a sidewall structure 130, a light source 140, a diffusion plate 150, and an optical film set 160.

The haze value of the reflection plate 110 is 20% to 98%, and the reflection rate of the reflection plate 110 is 90% to 98%.

The light extraction plate 120 has a plurality of first holes 122, and the light extraction plate 120 and the reflection plate 110 are opposite to each other. For instance, the light extraction plate 120 is made of a material with a reflection rate greater than 90%, such as a white reflection sheet, a silver reflection sheet, a micro cellular PET (MCPET), high reflection metal, or any other appropriate high reflection material. In the present embodiment, the first holes 122 of the light extraction plate 120 have the same dimension.

The sidewall structure 130 is located between the light extraction plate 120 and the reflection plate 110. In an embodiment of the invention, the sidewall structure 130 is located between adjacent light emitting units 102, so as to define each of the light emitting units 102. That is, four sidewalls of each light emitting unit 102 are all equipped with the sidewall structure 130. However, the invention is not limited thereto, and it is feasible as long as at least one sidewall of each light emitting unit 102 is equipped with the sidewall structure 130. For instance, in other embodiments of the invention, only one sidewall of each light emitting unit 102 is equipped with the sidewall structure 130; alternatively, two or more sidewalls of each light emitting unit 102 are equipped with the sidewall structure 130. The sidewall structure 130 is made of a material with a reflection rate greater than 90%, such as a white reflection sheet, a silver reflection sheet, an MCPET, high reflection metal, or any other appropriate high reflection material.

The reflection plate 110, the light extraction plate 120, and the sidewall structure 130 together constitute a first light guiding cavity 104. The height H3 of the first light guiding cavity 104 ranges from 1 mm to 10 mm. In the present embodiment, the reflection plate 110, the light extraction plate 120, and the sidewall structure 130 are different components, for instance, which should however not be construed as a limitation to the invention; in other embodiments of the invention, the reflection plate 110 and the sidewall structure 130 are integrally formed, the light extraction plate 120 and the sidewall structure 130 are integrally formed, or the reflection light 110, the light extraction plate 120, and the sidewall structure 130 are integrally formed.

It should be mentioned that the sidewall structure 130 provided in the present embodiment has a plurality of second holes 132. To be specific, as shown in FIG. 4, the second holes 132 of the sidewall structure 130 occupy a first area A1, the sidewall structure 130 occupies a second area A2, and A1/(A1+A2)=0.03 to 0.95. Besides, the second holes 132 are cyclically distributed in the present embodiment, which should not be construed as a limitation to the invention; it is likely for the second holes 132 to be distributed in a non-cyclically manner. According to the present embodiment, a shape of the second holes 132 is a rectangle, for instance, and the second holes 132 of the sidewall structure 130 have a first height H1, a width W, and an interval X. The sidewall structure 130 has a second height H2. Here, the first height H1, the second height H2, the width W, and the interval X respectively refer to the maximum height, the maximum width, and the maximum interval. In the present embodiment, H1/H2=0.1 to 0.99, W/X=0.1 to 0.99, and X−W=0.1 mm to 25 mm. If the condition "X−W=0.1 mm to 25 mm" is satisfied, the uneven light leakage and the hot spots caused by uneven distribution of light intensity may be prevented.

With reference to FIG. 1 to FIG. 4, the light source 140 is located in the first light guiding cavity 104 and adjoins the sidewall structure 130. In particular, the light source 140 is located at the side or in a corner of the first light guiding cavity 104, and the number of the light source 140 may be singular or plural. In addition, an included angle θ between the light L having the maximum light emitting intensity and a normal direction of a light emitting surface of the light extraction plate 120 is greater than 45 degrees.

The diffusion plate 150 is located above the light extraction plate 120, and a second light guiding cavity 106 is formed between the light extraction plate 120 and the diffusion plate 150. The height H4 of the second light guiding cavity 106 ranges from 0.5 mm to 5 mm, and H3+H4<15 mm. In the present embodiment, the height H4 of the second light guiding cavity 106 may be adjusted according to the dimension of the first holes 122 of the light extraction plate 120, such that the light passing through the diffusion plate 150 may have the uniform distribution. For instance, when the dimension of the first holes 122 of the light extraction plate 120 increases, the height H4 increases as well, and so does the distance between the diffusion plate 150 and the first holes 122.

The optical film set 160 is located above the diffusion plate 150, and the diffusion plate 150 is located between the optical film set 160 and the light extraction plate 120. The optical film set 160 includes a prism, a diffusion sheet, a light collection sheet, a light enhancement sheet, a protection sheet, or a combination thereof.

As provided above, the light emitting units 102 has the design of two layers of light guiding cavities, i.e., the first light guiding cavity 104 (the lower light guiding cavity) and the second light guiding cavity 106 (the upper light guiding cavity). The light source 140 is located in the first light guiding cavity 104 (the lower light guiding cavity) and adjoins the sidewall structure 130 having the second holes 132. The light source 140 emits light from the first light guiding cavity 104 (the lower light guiding cavity), and the included angle θ between the light L having the maximum light emitting intensity and the normal direction of the light emitting surface of the light extraction plate 120 is greater than 45 degrees, such that the light emitted from the light source 140 passes through the first holes 122 of the light extraction plate 120, reaches the second light guiding cavity 106 (the upper light guiding cavity), and passes through the diffusion plate 150 and the optical film set 160. The resultant emitted light may have the uniform distribution. Due to the design of two layers of light guiding cavities in the light emitting units 102 and the angle at which the light source 140 is arranged, the total thickness (or the total height) of the cavities may be reduced to be smaller than 15 mm (or even reduced to 3 mm to 10 mm), and the systematic light emitting efficiency may be improved. Furthermore, in comparison with the conventional edge-type light source module, the light source module provided herein may have the reduced thickness.

The sidewall structure 130 has the second holes 132, and the ratio of the area A1 occupied by the second holes 132 to the area A2 occupied by the sidewall structure 130 is A1/(A1+A2)=0.03 to 0.95; hence, when each of the light emitting units 102 is lightened, the junctions where the lightened light emitting units 102 and the adjacent non-irradiated regions are connected are less noticeable, and thereby the dark zones between/among the bright regions may be prevented. That is, the splicing edges between/among the light emitting units 102 may be blurred, so as to ensure the uniformity of the luminance of the light source module 100 and further improve the display quality of the display device. Particularly, if the splicing light emitting units are in an all white state or in an all black state, the luminance may be drastically changed at the splicing edges between/among the light emitting units 102. However, the splicing light emitting units 102 in the light source module 100 may not have sharp difference in luminance at the splicing edges between/among the light emitting units 102, and therefore images are not poorly displayed at the splicing edges.

In the previous embodiment shown in FIG. 4, the second holes 132 are respectively shaped as a rectangle. Nevertheless, the invention should not be construed as limited to the embodiment set forth herein. In other embodiments of the invention, as exemplarily shown in FIG. 5 and FIG. 6, the shape of the second holes of the sidewall structure may be, in addition to the rectangle, a square, a triangle, a circle, an ellipse, a trapezoid, a polygon, an irregular shape, or any other appropriate shape. Besides, the second holes may be cyclically distributed or non-cyclically distributed in other embodiments of the invention.

Figure 5:
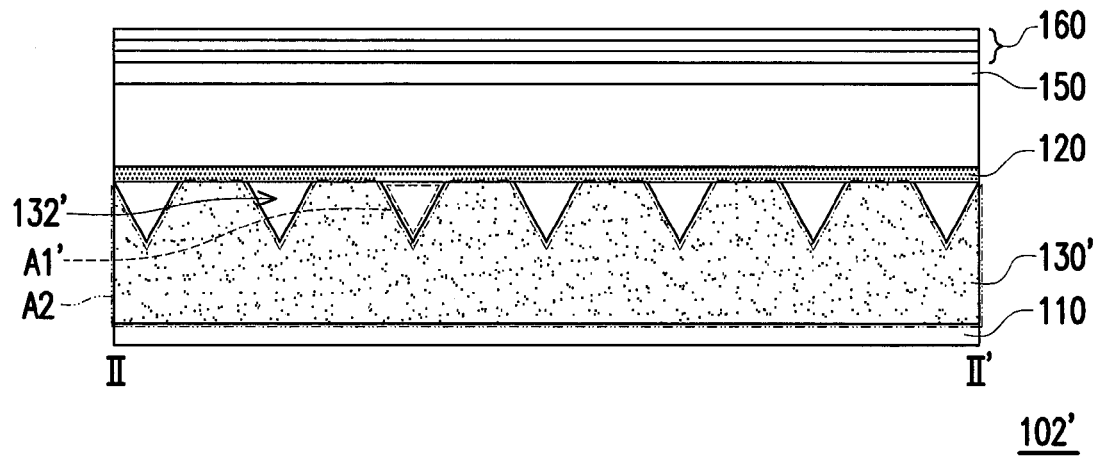
FIG. 5 and FIG. 6 are schematic cross-sectional diagrams respectively illustrating light emitting units with different sidewall structures.
Figure 6:
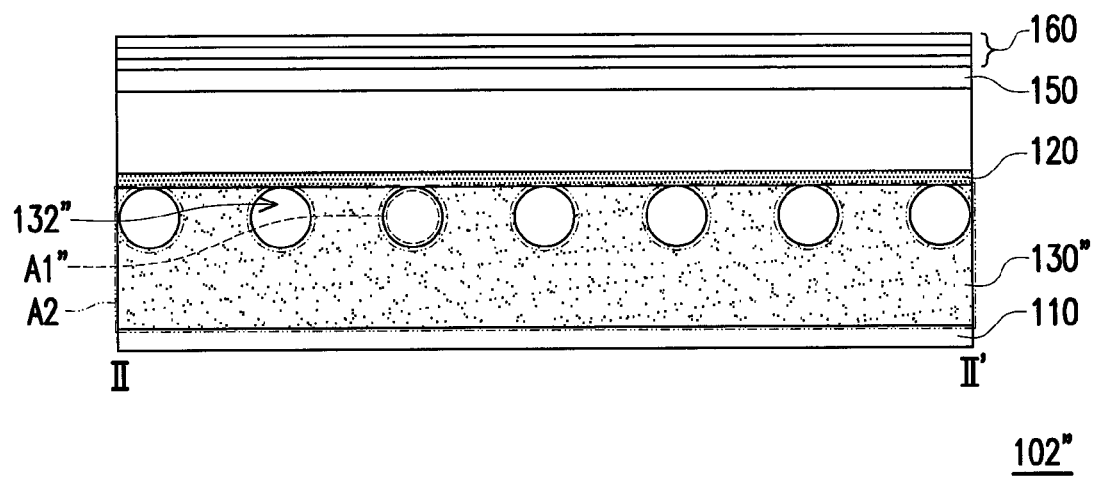

FIG. 5 and FIG. 6 are schematic cross-sectional diagrams respectively illustrating light emitting units with different sidewall structures. The embodiments depicted in FIG. 5 and FIG. 6 are similar to that depicted in FIG. 4; therefore, the identical or similar devices in these embodiments are represented by the identical or similar reference numbers and will not be further explained.

With reference to FIG. 5, the difference between the embodiment shown in FIG. 5 and the previous embodiment illustrated in FIG. 4 lies in that the second holes 132' of the sidewall structures 130' are respectively shaped as a triangle. Moreover, the second holes 132' of the sidewall structure 130' occupy a first area A1', the sidewall structure 130' occupies a second area A2, and A1'/(A1'+A2)=0.03 to 0.95.

With reference to FIG. 6, the difference between the embodiment shown in FIG. 6 and the previous embodiment illustrated in FIG. 4 lies in that the second holes 132" of the sidewall structures 130" in the light emitting units 102" are respectively shaped as a circle. Moreover, the second holes 132" of the sidewall structure 130" occupy a first area A1", the sidewall structure 130" occupies a second area A2, and A1"/(A1"+A2)=0.03 to 0.95.

It should be mentioned that the sidewall structure 130 provided in the embodiments shown in FIG. 3 to FIG. 6 has the second holes. Nevertheless, the invention should not be construed as limited to the embodiments set forth herein. The sidewall structure provided in other embodiments of the invention may not be equipped with the holes.

Figure 7:
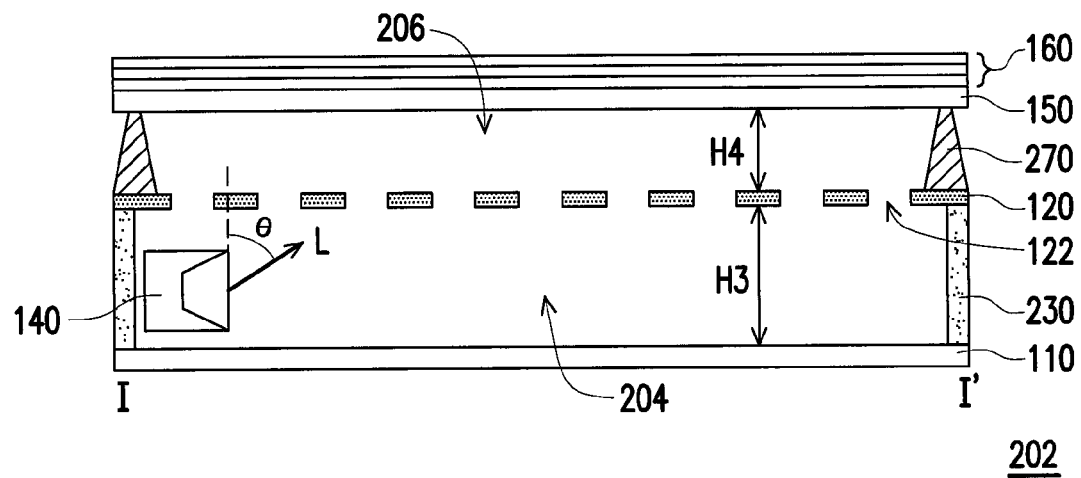
FIG. 7 is a schematic cross-sectional diagram illustrating light emitting units according to a second embodiment of the invention.
Figure 8:
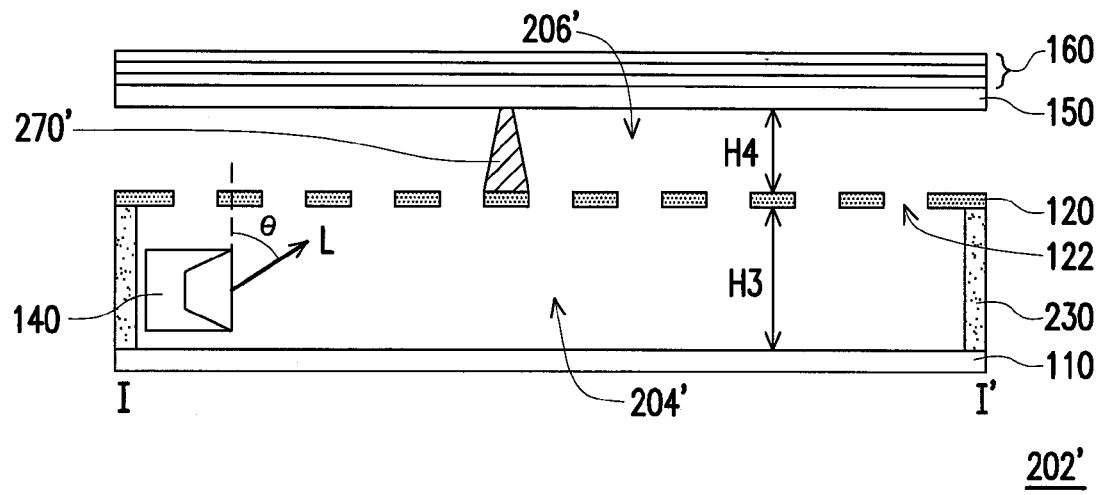
FIG. 8 and FIG. 9 are schematic cross-sectional diagrams respectively illustrating light emitting units with different support structures.
Figure 9:
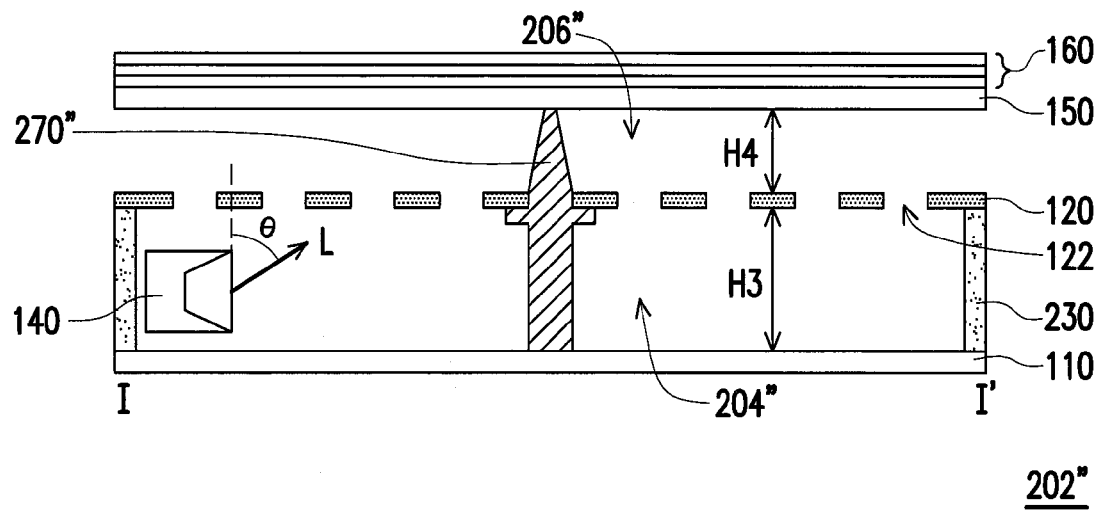

FIG. 7 is a schematic cross-sectional diagram illustrating light emitting units according to a second embodiment of the invention. FIG. 8 and FIG. 9 are schematic cross-sectional diagrams respectively illustrating light emitting units with different support structures. The embodiments depicted in FIG. 7 to FIG. 9 are similar to that depicted in FIG. 3, and the sidewall structure respectively shown in FIG. 7 to FIG. 9 may or may not be equipped with the holes; therefore, the identical or similar devices in these embodiments are represented by the identical or similar reference numbers and will not be further explained. The difference between the embodiments depicted in FIG. 7 to FIG. 9 and the embodiment depicted in FIG. 3 lies in that the second light guiding cavity (the upper light guiding cavity) has a support structure, which will be elaborated hereinafter.

With reference to FIG. 7, in each of the light emitting units 202, the reflection plate 110, the light extraction plate 120, and the sidewall structure 230 together constitute a first light guiding cavity 204. The height H3 of the first light guiding cavity 104 ranges from 1 mm to 10 mm. The second light guiding cavity 206 is formed between the light extraction plate 120 and the diffusion plate 150. In the present embodiment, the support structure 270 is located between the light extraction plate 120 and the diffusion plate 150, and the number of the support structure 270 may be singular or plural. Specifically, the support structure 270 is located on the sidewall structure 230 and in the second light guiding cavity 206 (the upper light guiding cavity), such that the height H4 of the second light guiding cavity 206 ranges from 0.5 mm to 5 mm, and H3+H4<15 mm.

Note that the second light guiding cavity 206 has the support structure 270 and thus has the height H4 ranging from 0.5 mm to 5 mm, and a portion of light may pass through the space defined by the second light guiding cavity 206 and holes (not shown) between/among the support structures 270 and may then be transmitted to the adjacent light emitting units 202. Accordingly, when each of the light emitting units 202 is lightened, the junctions where the lightened light emitting units 102 and the adjacent non-irradiated regions are connected are less noticeable, and thereby the dark zones between/among the bright regions may be prevented. That is, the splicing edges between/among the light emitting units 202 may be blurred, so as to ensure the uniformity of the luminance of the light source module 100 and further improve the display quality of the display device. Particularly, if the splicing light emitting units are in an all white state or in an all black state, the luminance may be drastically changed at the splicing edges between/among the light emitting units 202. However, the splicing light emitting units 202 in the light source module 100 may not have sharp difference in luminance at the splicing edges between/among the light emitting units 202, and therefore images are not poorly displayed at the splicing edges.

In the embodiment shown in FIG. 7, the support structure 270 is located on the sidewall structure 230. Nevertheless, the invention should not be construed as limited to the embodiments set forth herein. In other embodiments of the invention, as exemplarily shown in FIG. 8 and FIG. 9, the support structure may also be located at other places.

With reference to FIG. 8, in each of the light emitting units 202', the reflection plate 110, the light extraction plate 120, and the sidewall structure 230 together constitute a first light guiding cavity 204'. The second light guiding cavity 206' is formed between the light extraction plate 120 and the diffusion plate 150. In the present embodiment, the support structure 270' is located between the light extraction plate 120 and the diffusion plate 150, and the number of the support structure 270' may be singular or plural. In particular, the support structure 270' is located on the light extraction plate 120 and in the second light guiding cavity 206' (the upper light guiding cavity).

With reference to FIG. 9, in each of the light emitting units 202", the reflection plate 110, the light extraction plate 120, and the sidewall structure 230 together constitute a first light guiding cavity 204". The second light guiding cavity 206" is formed between the light extraction plate 120 and the diffusion plate 150. In the present embodiment, the support structure 270" is located between the light extraction plate 120 and the diffusion plate 150, and the number of the support structure 270" may be singular or plural. In particular, the support structure 270" is located on the reflection plate 110, and the support structure 270" passes through one of the first holes 122 of the light extraction plate 120 and extends to the diffusion plate 150.

In the previous embodiments shown in FIG. 3 to FIG. 9, the dimension of the first holes 122 of the light extraction plate 120 is identical, for instance, while the invention is not limited thereto. In other embodiments of the invention, as exemplarily shown in FIG. 10, the dimension of the first holes of the light extraction plate may be different, may be gradually changed, or may be changed in any other appropriate manner.

Figure 10:
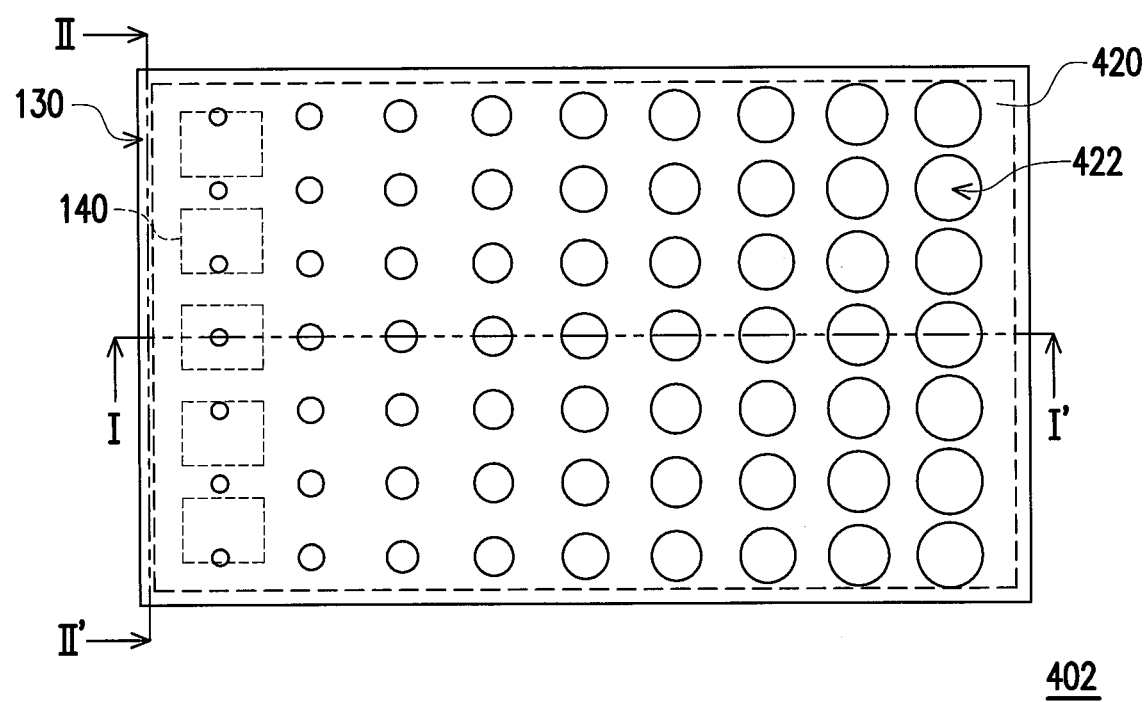
FIG. 10 is a schematic top view illustrating light emitting units according to a third embodiment of the invention.

FIG. 10 is a schematic top view illustrating light emitting units according to a third embodiment of the invention. The embodiment depicted in FIG. 10 is similar to that depicted in FIG. 2; therefore, the identical or similar devices in these two embodiments are represented by the identical or similar reference numbers and will not be further explained.

With reference to FIG. 10, the difference between the embodiment shown in FIG. 10 and the previous embodiment illustrated in FIG. 2 lies in the dimension and the distribution of the first holes of the light extraction plate. Particularly, in each light emitting unit 402, the dimension of the first holes 422 of the light extraction plate 420 increases together with an increase in a distance from the first holes 422 to the light source 140. The light source 140 is located at the side or in a corner of the light guiding cavity and is located below the light extraction plate 420. Since the dimension of the first holes 422 increases together with the increase in the distance from the first holes 422 to the light source 140, the light emitting amount of the holes close to the light source 140 or away from the light source 140 stays unchanged, and thereby the emitted light may be evenly distributed. Besides, the sidewall structures, the support structures, or a combination thereof, as exemplified in the embodiments shown in FIG. 3 to FIG. 9, may be applicable in the present embodiment and should not be construed as a limitation to the invention.

Figure 11:
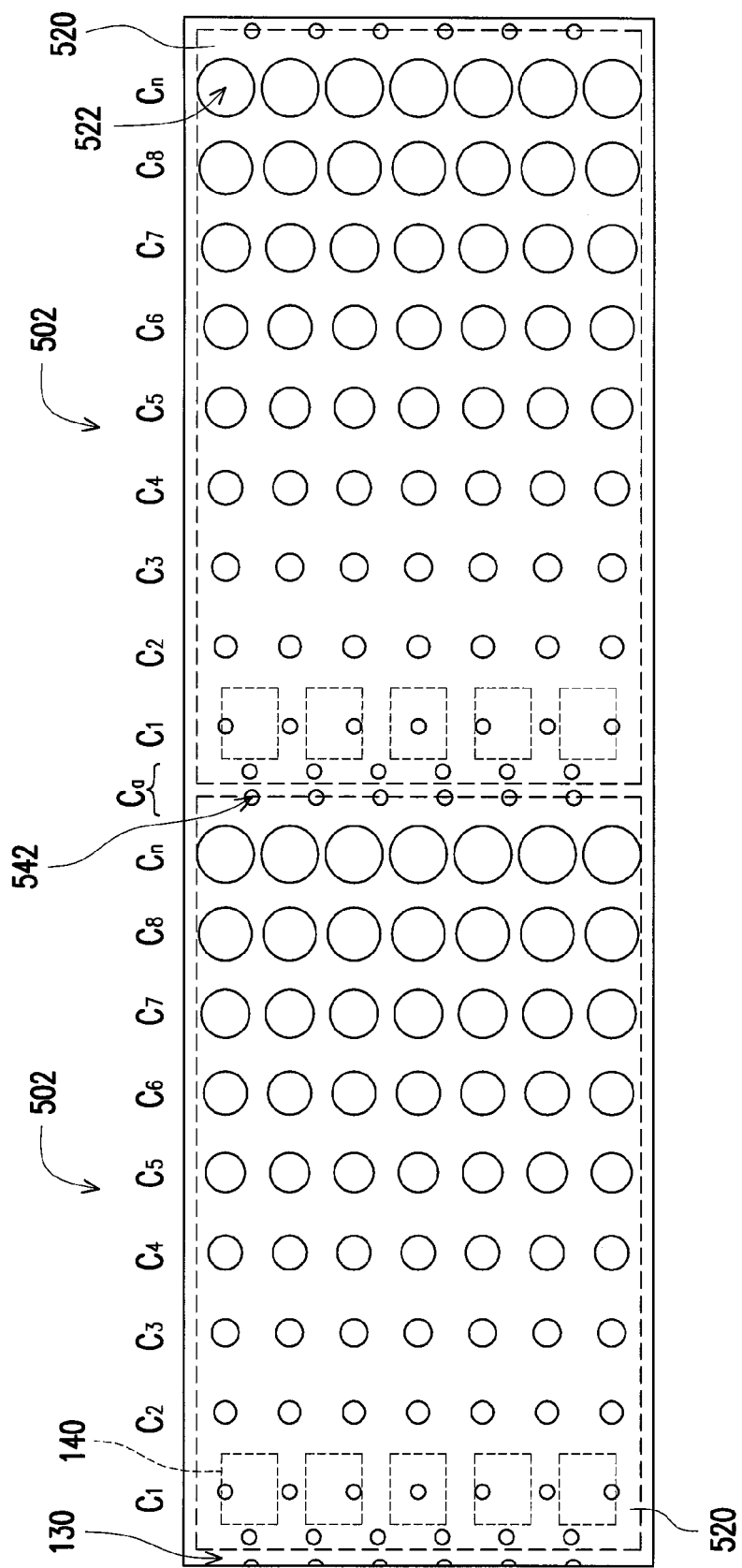
FIG. 11 is a schematic top view illustrating light emitting units according to a fourth embodiment of the invention.

FIG. 11 is a schematic top view illustrating light emitting units according to a fourth embodiment of the invention. The embodiment depicted in FIG. 11 is similar to that depicted in FIG. 10; therefore, the identical or similar devices in these two embodiments are represented by the identical or similar reference numbers and will not be further explained.

With reference to FIG. 11, the difference between the embodiment shown in FIG. 11 and the previous embodiment illustrated in FIG. 10 lies in that the light extraction plate 520 provided herein further includes a plurality of holes 542. Particularly, in each light emitting unit 502, the dimension of the first holes 522 of the light extraction plate 520 increases together with an increase in a distance from the first holes 522 to the light source 140. Specifically, in a direction away from the light source 140, the first holes 522 are arranged sequentially in columns $C_1$ to $C_n$, and a dimension of the first holes 522 increases from the first column $C_1$ to the $n^{th}$ column $C_n$. Here, the dimension of the first holes 522 in any of the columns $C_1$ to $C_n$ remains unchanged. The holes 542 are between the first holes 522 arranged in the $n^{th}$ column $C_n$ in each of the light emitting units 502 (e.g., the $n^{th}$ column $C_n$ in the left light emitting unit 502) and the first holes 522 arranged in the first column $C_1$ in another light emitting unit 502 adjacent to the each of the light emitting units 502 (e.g., the first column $C_1$ in the right light emitting unit 502). The holes are arranged in two columns Ca (e.g., the left column and the right column), geometric center lines (not shown) among the holes 542 in the two columns are not overlapped, and parts of the holes 542 in one of the columns Ca are overlapped with the sidewall structure 130. However, the invention is not limited thereto; in another embodiment, as long as the holes 542 are arranged in at least one column $C_a$, and parts of the holes 542 are overlapped with the sidewall structure 130, the holes 542 do not depart from the scope of protection of the invention.

The dimension and the shape of the holes 542 arranged in two columns Ca are the same as those of the first holes 522 arranged in the adjacent first column $C_1$, for instance, while the invention is not limited thereto. In other embodiments of the invention, the dimension and the shape of the holes 542 arranged in two columns Ca may be different from those of the first holes 522 arranged in the adjacent first column $C_1$, or the dimension and the shape of the holes 542 arranged in any two columns Ca may be the same or different. The holes 542 may each be shaped as a rectangle, a square, a triangle, a circle, an ellipse, a trapezoid, a polygon, an irregular shape, or any other appropriate shape.

Note that the light source 140 is located at the side or in a corner of the light guiding cavity and is located below the light extraction plate 520. Since the dimension of the first holes 522 increases together with the increase in the distance from the first holes 522 to the light source 140, the light emitting amount of the holes close to the light source 140 or away from the light source 140 stays unchanged, and thereby the emitted light may be evenly distributed. Besides, the sidewall structures, the support structures, or a combination thereof, as exemplified in the embodiments shown in FIG. 3 to FIG. 9, may be applicable in the present embodiment and should not be construed as a limitation to the invention.

Moreover, the holes 542 arranged in at least one column $C_a$ between two adjacent light emitting units 502 are not only conducive to the reduction of variations to the aperture ratio during the assembly of the light extraction plate 520 but also capable of increasing the tolerance to the alignment error arising in the light extraction plate 520. In particular, the holes 542 arranged in at least one column $C_a$ are partially overlapped with the sidewall structure 130, and thus parts of the holes 542 are located above the sidewall structure 130. Thereby, if any alignment error arises in the light extraction plate 520 during the assembly, e.g., parts of the first holes 522 may be covered by the sidewall structure 130, thus affecting the aperture ratio and generating bright and dark zones, the holes 542 may serve to compensate (or reduce) the changes to the aperture ratio of the first holes 522 and further resolve the issue of bright and dark zones as well as improve the quality of the display images. In other words, the design of the holes 542 contributes to the reduction of the changes to the aperture ratio during the assembly of the light extraction plate 520, and the tolerance to the alignment error arising in the light extraction plate 520 may be correspondingly increased. For instance, compared to the design of the light emitting units having no holes 542 (e.g., the light emitting units 402 depicted in FIG. 10), the design of the light emitting units 502 having the holes 542 arranged in two columns Ca allows the aperture ratio of the first holes 522 to be reduced from 8% to 2%, and the tolerance to the alignment error is raised from 0.4 mm to 0.8 mm.

Figure 12:
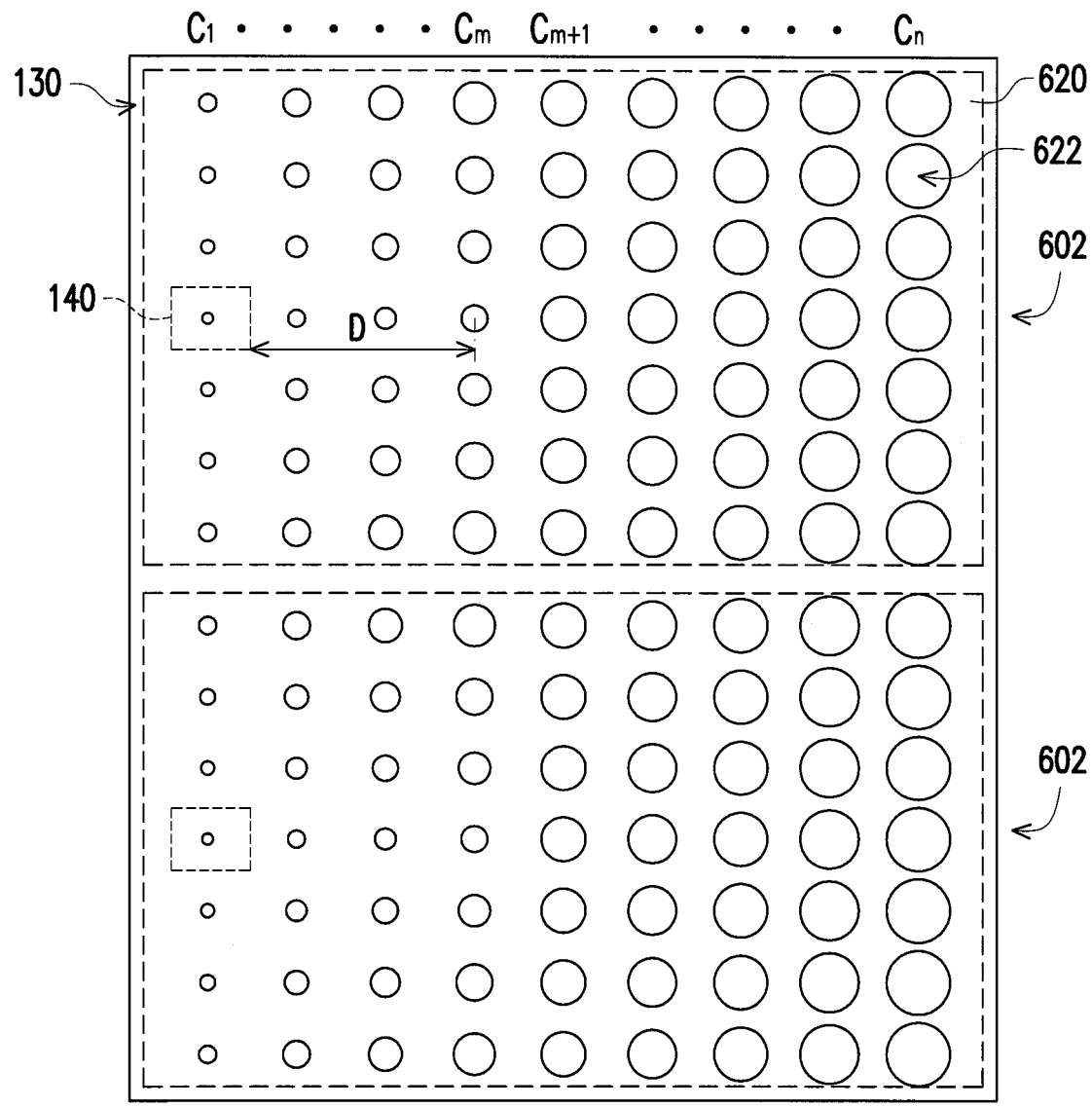
FIG. 12 is a schematic top view illustrating light emitting units according to a fifth embodiment of the invention.

FIG. 12 is a schematic top view illustrating light emitting units according to a fifth embodiment of the invention. The embodiment depicted in FIG. 12 is similar to that depicted in FIG. 2; therefore, the identical or similar devices in these two embodiments are represented by the identical or similar reference numbers and will not be further explained.

With reference to FIG. 12, the difference between the embodiment shown in FIG. 12 and the previous embodiment illustrated in FIG. 2 lies in the dimension and the distribution of the first holes 622 of the light extraction plate 620. Particularly, in each light emitting unit 602, the dimension of the first holes 622 of the light extraction plate 620 increases together with an increase in a distance from the first holes 622 to the light source 140. Specifically, in a direction away from the light source 140, the first holes 622 are arranged sequentially in columns $C_1$ to $C_n$, and a dimension of the first holes 622 increases from the first column $C_1$ to the $n^{th}$ column $C_n$. Each of the light emitting units 602 is separated into two parts, i.e., the columns $C_1$ to $C_m$ and the columns $C_{m+1}$ to $C_n$. The $m^{th}$ column $C_m$ is located between the first column $C_1$ and the $n^{th}$ column $C_n$. Here, the shortest distance from the $m^{th}$ column $C_m$ to the light source 140 is D, the first light guiding cavity 104 (as shown in FIG. 3) has a height H3, and H3/D is greater than 0.176, for instance. In the columns $C_1$ to $C_m$ adjacent to the light source 140, the dimensions of the first holes 622 of the light extraction plate 620 in each of the columns $C_1$ to $C_m$ increase upon an increase of distances from the first holes 622 to the light source 140. That is, the dimensions of the first holes 622 in each of the columns $C_1$ to $C_m$ may vary; specifically, the first holes 622 adjacent to the light source 140 is smaller than the first holes 622 away from the light source 140. That is, in each of the columns $C_1$ to $C_m$, the first holes 622 right in front of each light source 140 are smaller than the first holes 622 between two adjacent light sources 140 (e.g., at the junction between an upper light emitting unit 602 and a lower light emitting unit 602). In the columns away from the light source 140, the dimension of the first holes 622 arranged in any of the columns $C_{m+1}$ to $C_n$ remains unchanged.

Note that the light source 140 is located at the side or in a corner of the light guiding cavity and is located below the light extraction plate 620. Since the dimension of the first holes 622 increases together with the increase in the distance from the first holes 622 to the light source 140, the light emitting amount of the holes close to the light source 140 or away from the light source 140 stays unchanged, and thereby the emitted light may be evenly distributed. Besides, the sidewall structures, the support structures, or a combination thereof, as exemplified in the embodiments shown in FIG. 3 to FIG. 9, may be applicable in the present embodiment and should not be construed as a limitation to the invention.

It should be mentioned that the variations in the dimension of the first holes 622 arranged in any of the columns $C_1$ to $C_m$ adjacent to the light source 140 are optimized according to the present embodiment. Since the changes to the dimension (i.e., the difference between the maximum and minimum dimensions) of the first holes 622 arranged in any of the columns $C_1$ to $C_m$ are gradually reduced to 0 (i.e., the dimension of the first holes 622 in any of the columns remains unchanged), the uneven light leakage and the hot spots caused by uneven distribution of light intensity may be further prevented.

Figure 13:
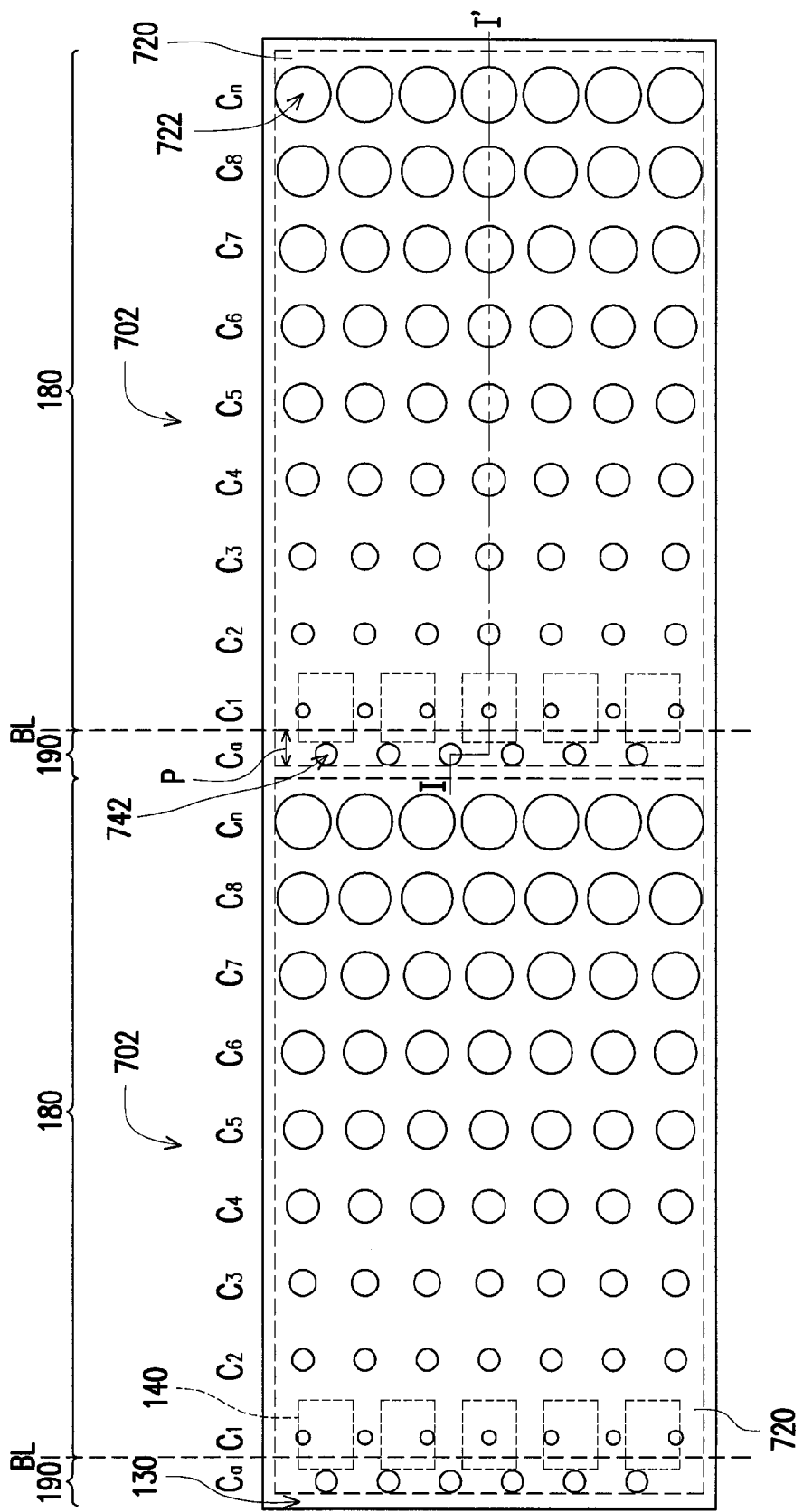
FIG. 13 is a schematic top view illustrating a light emitting unit according to a sixth embodiment of the invention.
Figure 14:
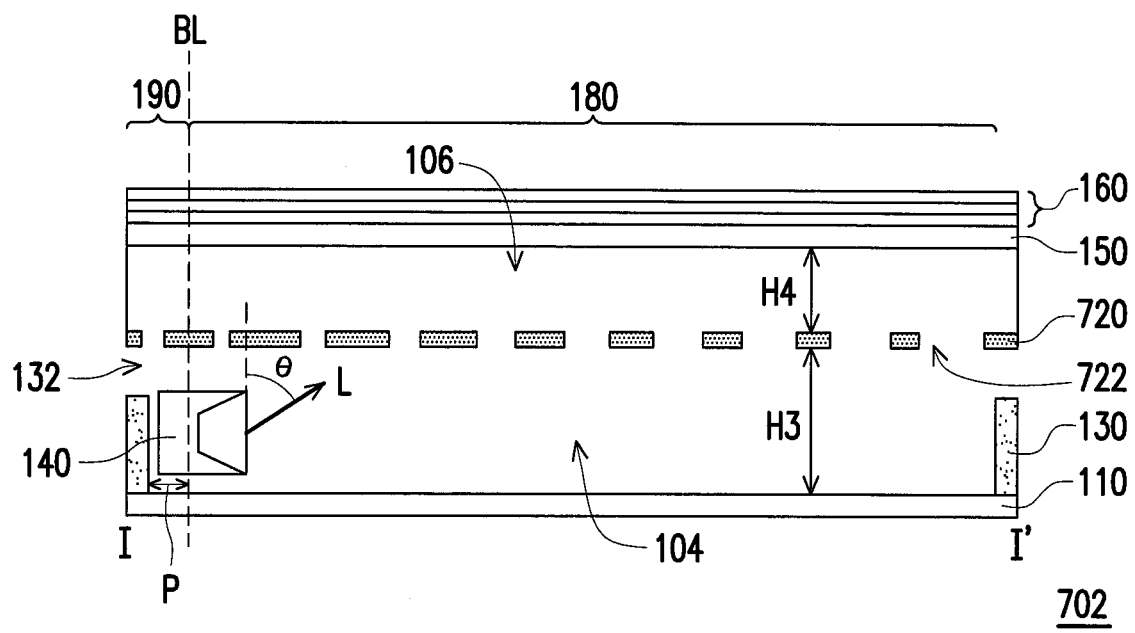
FIG. 14 is a schematic cross-sectional diagram illustrating the light emitting unit along a line I-I' depicted in FIG. 13.

FIG. 13 is a schematic top view illustrating a light emitting unit according to a sixth embodiment of the invention. FIG. 14 is a schematic cross-sectional diagram illustrating the light emitting unit along a line I-I' depicted in FIG. 13. The embodiment depicted in FIG. 13 and FIG. 14 is similar to that depicted in FIG. 3 and FIG. 10; therefore, the identical or similar devices in these embodiments are represented by the identical or similar reference numbers and will not be further explained.

With reference to FIG. 13 and FIG. 14, the difference between the embodiment shown in FIG. 13 and FIG. 14 and the previous embodiment illustrated in FIG. 3 and FIG. 10 lies in that the light extraction plate 720 provided herein further includes a plurality of holes 742. Each of the light emitting units 702 includes a uniformity adjustment region 180 and a brightness compensation region 190. A junction line BL is between the uniformity adjustment region 180 and the brightness compensation region 190, the shortest distance from the junction line BL to the sidewall structure 130 is P, and $0.2 \times H3 < P < 5 \times H3$. That is, the shortest distance P is 0.2 to 5 times the height H3 of the first light guiding cavity 104.

The first holes 722 of the light extraction plate 720 are located in the uniformity adjustment region 180. The dimension of the first holes 722 of the light extraction plate 720 increases together with an increase in a distance from the first holes 722 to the light source 140. Specifically, in a direction away from the light source 140, the first holes 722 are arranged sequentially in columns $C_1$ to $C_n$, and the dimension of the first holes 722 increases from the first column $C_1$ to the $n^{th}$ column $C_n$. Here, the dimension of the first holes 722 in any of the columns $C_1$ to $C_n$ remains unchanged. Namely, the first column $C_1$ to the $n^{th}$ column $C_n$ are located in the uniformity adjustment region 180.

The holes 742 are between the first holes 722 arranged in the $n^{th}$ column $C_n$ in each of the light emitting units 702 (e.g., the $n^{th}$ column $C_n$ in the left light emitting unit 702) and the first holes 722 arranged in the first column $C_1$ in another light emitting unit 702 adjacent to the each of the light emitting units 702 (e.g., the first column $C_1$ in the right light emitting unit 702). The holes 742 are located in the brightness compensation region 190. Besides, the holes 742 are arranged in at least one column $C_a$ and may be overlapped or may not be overlapped with the sidewall structure 130, which should not be construed as limitations to the invention. That is, the at least one column $C_a$ is located in the brightness compensation region 190. The dimension of the holes 742 arranged in the column $C_a$ is between the dimension of the first holes 722 arranged in the first column $C_1$ and the dimension of the first holes 722 arranged in the $n^{th}$ column $C_n$, and an aperture ratio of the holes 742 arranged in the at least one column $C_a$ in the brightness compensation region 190 is from about 5% to about 43%, for instance. The holes 742 may each be shaped as a rectangle, a square, a triangle, a circle, an ellipse, a trapezoid, a polygon, an irregular shape, or any other appropriate shape.

Figure 15:
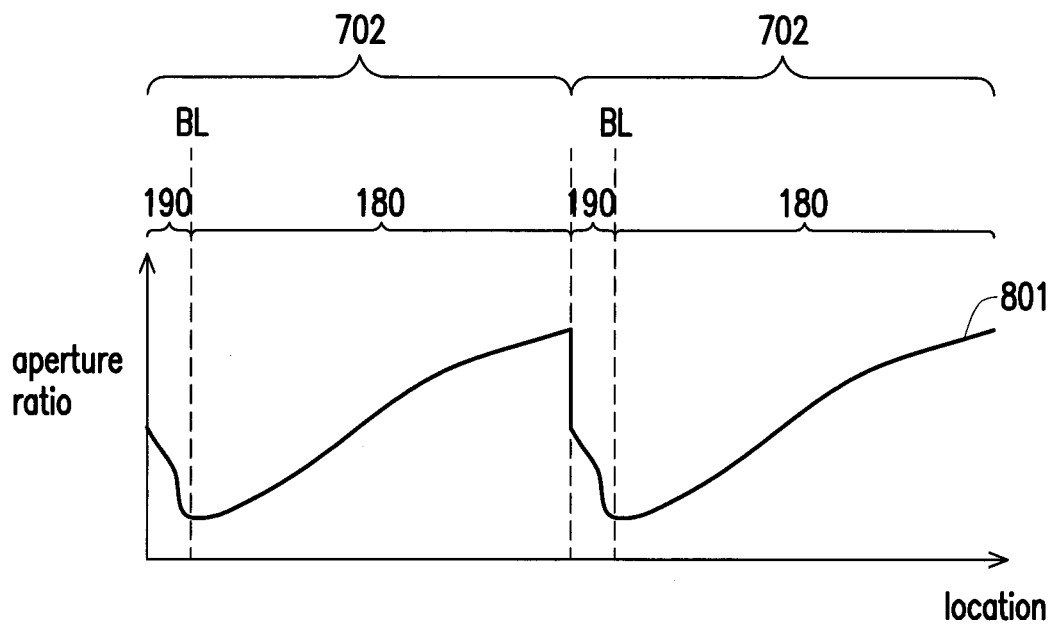
FIG. 15 is a curve diagram illustrating the relationship between the location of holes and an aperture ratio of the light emitting units shown in FIG. 13.

Note that the light source 140 is located at the side or in a corner of the light guiding cavity and is located below the light extraction plate 720. As shown in FIG. 15, which is a curve diagram illustrating the relationship between the location of holes and an aperture ratio of the light emitting units shown in FIG. 13, the curve 801 indicates that the aperture ratio in the uniformity adjustment region 180 gradually increases according to the locations of the holes from left to right, i.e., the holes in each of the light emitting units 702 are sequentially arranged from the column $C_a$ to the $n^{th}$ column $C_n$. On the contrary, the curve 801 indicates that the aperture ratio in the brightness compensation region 190 gradually decreases according to the locations of the holes from left to right, and the aperture ratio in the brightness compensation region 190 falls between the minimum aperture ratio and the maximum aperture ratio in the uniformity adjustment region 180. To be specific, each of the light emitting units 702 provided in the present embodiment includes a uniformity adjustment region 180 and a brightness compensation region 190. In the uniformity adjustment region 180, the dimension of the first holes 722 arranged in the first column $C_1$ to the $n^{th}$ column $C_n$ increases together with the increase in the distance from the first holes 722 to the light source 140; hence, the light emitting amount of the holes close to the light source 140 or away from the light source 140 stays unchanged, and the light emitted from each of the light emitting units 702 may be evenly distributed. Besides, in the brightness compensation region 190, the dimension of the holes 742 arranged in the column $C_a$ is designed to be between the dimension of the first holes 722 arranged in the first column $C_1$ and the dimension of the first holes 722 arranged in the $n^{th}$ column $C_n$, and thus the holes 742 may serve to compensate (or reduce) the changes to the aperture ratio of the first holes 722 between two adjacent light emitting units 702 and further resolve the issue of bright and dark zones as well as improve the quality of the display images.

Besides, the sidewall structures, the support structures, or a combination thereof, as exemplified in the embodiments shown in FIG. 3 to FIG. 9, may be applicable in the present embodiment and should not be construed as a limitation to the invention. The first holes 122, 422, 522, 622, and 722 and the holes 542 and 742 shown in FIG. 2 and FIG. 10 to FIG. 13 may be combined and implemented at will, and the invention is not limited thereto.

To sum up, in the light source module described herein, each light emitting unit includes the first light guiding cavity and the second light guiding cavity. The light source is located in the first light guiding cavity and adjoins the sidewall structure, and the sidewall structure has the second holes. Besides, the support structure may be placed between the light extraction plate and the diffusion plate. Due to the design of two layers of light guiding cavities in the light emitting units and the angle at which the light source is arranged, the total thickness of the cavities may be reduced, and the systematic light emitting efficiency may be improved. Furthermore, in comparison with the conventional edge-type light source module, the light source module provided herein may have the reduced thickness. When each of the light emitting units is lightened, the junctions where the lightened light emitting units and the adjacent non-irradiated regions are connected are less noticeable, and thereby the dark zones between/among the bright regions may be prevented. That is, the splicing edges between/among the light emitting units may be blurred, so as to ensure the uniformity of the luminance of the light source module and further improve the display quality of the display device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A light source module comprising a plurality of light emitting units, each of the light emitting units comprising:
    a reflection plate;
    a light extraction plate arranged opposite to the reflection plate, the light extraction plate having a plurality of first holes;
    a sidewall structure located between the reflection plate and the light extraction plate, the sidewall structure having a plurality of second holes, the reflection plate, the light extraction plate, and the sidewall structure together constituting a first light guiding cavity;
    a light source located in the first light guiding cavity, the light source adjoining the sidewall structure; and
    a diffusion plate located above the light extraction plate, a second light guiding cavity being formed between the light extraction plate and the diffusion plate.

2. The light source module as recited in claim 1, wherein the second holes of the sidewall structure occupy a first area A1, the sidewall structure occupies a second area A2, and A1/(A1+A2)=0.03 to 0.95.

3. The light source module as recited in claim 1, wherein a shape of the second holes of the sidewall structure comprises a rectangle, a square, a triangle, a circle, an ellipse, a trapezoid, a polygon, or an irregular shape.

4. The light source module as recited in claim 1, wherein the second holes are cyclically distributed or non-cyclically distributed.

5. The light source module as recited in claim 1, wherein the second holes of the sidewall structure have a first height H1, a width W, and an interval X, the sidewall structure has a second height H2, H1/H2=0.1 to 0.99, and W/X=0.1 to 0.99.

6. The light source module as recited in claim 5, wherein X−W=0.1 mm to 25 mm.

7. The light source module as recited in claim 1, wherein the first light guiding cavity and the second light guiding cavity respectively have a height H3 and a height H4, H3 ranges from 1 mm to 10 mm, H4 ranges from 0.5 mm to 5 mm, and H3+H4<15 mm.

8. The light source module as recited in claim 1, wherein the first holes of the light extraction plate are arranged sequentially in columns $C_1$ to $C_n$ in a direction away from the light source, and a dimension of the first holes increases from the first column $C_1$ to the $n^{th}$ column $C_n$.

9. The light source module as recited in claim 8, wherein holes are between the first holes arranged in the $n^{th}$ column $C_n$ in each of the light emitting units and the first holes arranged in the first column $C_1$ in one of the light emitting units adjacent to the each of the light emitting units, and the holes are arranged in at least one column $C_a$.

10. The light source module as recited in claim 9, wherein parts of the holes are overlapped with the sidewall structure.

11. The light source module as recited in claim 9, wherein the first light guiding cavity has a height H3, the first column to the $n^{th}$ column are located in a uniformity adjustment region, the at least one column $C_a$ is located in a brightness compensation region, a junction line is between the uniformity adjustment region and the brightness compensation region, a shortest distance from the junction line to the side wall is P, and 0.2×H3<P<5×H3.

12. The light source module as recited in claim 11, wherein an aperture ratio of the holes arranged in the at least one column $C_a$ is from about 5% to about 43%.

13. The light source module as recited in claim 11, wherein a dimension of the holes arranged in the at least one column $C_a$ is between the dimension of the first holes arranged in the first column $C_1$ and the dimension of the first holes arranged in the $n^{th}$ column $C_n$.

14. The light source module as recited in claim 8, wherein the dimension of the first holes in each of the columns $C_1$ to $C_n$ remains unchanged.

15. The light source module as recited in claim 8, wherein the first light guiding cavity has a height H3, a shortest distance from an $m^{th}$ column $C_m$ to the light source, which are between the first column $C_1$ and the $n^{th}$ column $C_n$, is D, H3/D is greater than 0.176, the dimensions of the first holes arranged in each of the columns $C_1$ to $C_m$ increase upon an increase of distances from the first holes to the light source, and the dimensions of the first holes arranged in any of the columns $C_{m+1}$ to $C_n$ are identical.

16. The light source module as recited in claim 1, further comprising a support structure located between the light extraction plate and the diffusion plate.

17. The light source module as recited in claim 16, wherein the support structure is located on the sidewall structure.

18. The light source module as recited in claim 16, wherein the support structure is located on the reflection plate, and the support structure passes through one of the first holes of the light extraction plate and extends to the diffusion plate.

19. A light source module comprising a plurality of light emitting units, each of the light emitting units comprising:
   a reflection plate;
   a light extraction plate arranged opposite to the reflection plate, the light extraction plate having a plurality of first holes;
   a sidewall structure located between the reflection plate and the light extraction plate, the reflection plate, the light extraction plate, and the sidewall structure together constituting a first light guiding cavity;
   a light source located in the first light guiding cavity, the light source adjoining the sidewall structure;
   a diffusion plate located above the light extraction plate, a second light guiding cavity being formed between the light extraction plate and the diffusion plate; and
   a support structure located between the light extraction plate and the diffusion plate.

20. The light source module as recited in claim 19, wherein the support structure is located on the sidewall structure.

21. The light source module as recited in claim 19, wherein the support structure is located on the reflection plate, and the support structure passes through one of the first holes of the light extraction plate and extends to the diffusion plate.

22. The light source module as recited in claim 19, wherein the sidewall structure has a plurality of second holes, the second holes of the sidewall structure occupy a first area A1, the sidewall structure occupies a second area A2, and A1/(A1+A2)=0.03 to 0.95.

23. The light source module as recited in claim 22, wherein a shape of the second holes of the sidewall structure comprises a rectangle, a square, a triangle, a circle, an ellipse, a trapezoid, a polygon, or an irregular shape.

24. The light source module as recited in claim 22, wherein the second holes are cyclically distributed or non-cyclically distributed.

25. The light source module as recited in claim 22, wherein the second holes of the sidewall structure have a first height H1, a width W, and an interval X, the sidewall structure has a second height H2, H1/H2=0.1 to 0.99, and W/X=0.1 to 0.99.

26. The light source module as recited in claim 25, wherein X−W=0.1 mm to 25 mm.

27. The light source module as recited in claim 22, wherein the first light guiding cavity and the second light guiding cavity respectively have a height H3 and a height H4, H3 ranges from 1 mm to 10 mm, H4 ranges from 0.5 mm to 5 mm, and H3+H4<15 mm.

28. The light source module as recited in claim 19, wherein the first holes of the light extraction plate are arranged sequentially in columns $C_1$ to $C_n$ in a direction away from the light source, and a dimension of the first holes increases from the first column $C_1$ to the $n^{th}$ column $C_n$.

29. The light source module as recited in claim 28, wherein holes are between the first holes arranged in the $n^{th}$ column $C_n$ in each of the light emitting units and the first holes arranged in the first column $C_1$ in one of the light emitting units adjacent to the each of the light emitting units, and the holes are arranged in at least one column $C_a$.

30. The light source module as recited in claim 29, wherein parts of the holes are overlapped with the sidewall structure.

31. The light source module as recited in claim 29, wherein the first light guiding cavity has a height H3, the first column to the $n^{th}$ column are located in a uniformity adjustment region, the at least one column $C_a$ is located in a brightness compensation region, a junction line is between the uniformity adjustment region and the brightness compensation region, a shortest distance from the junction line to the sidewall structure is P, and 0.2×H3<P<5×H3.

32. The light source module as recited in claim 31, wherein an aperture ratio of the holes arranged in the at least one column $C_a$ is from about 5% to about 43%.

33. The light source module as recited in claim 31, wherein a dimension of the holes arranged in the at least one column $C_a$ is between the dimension of the first holes arranged in the first column $C_1$ and the dimension of the first holes arranged in the $n^{th}$ column $C_n$.

34. The light source module as recited in claim 28, wherein the dimension of the first holes in each of the columns $C_1$ to $C_n$ remains unchanged.

35. The light source module as recited in claim 28, wherein the first light guiding cavity has a height H3, a shortest distance from an $m^{th}$ column $C_m$ to the light source, which are between the first column $C_1$ and the $n^{th}$ column $C_n$, is D, H3/D is greater than 0.176, the dimensions of the first holes arranged in each of the columns $C_1$ to $C_m$ increase upon an increase of distances from the first holes to the light source, and the dimensions of the first holes arranged in any of the columns $C_{m+1}$ to $C_n$ are identical.

* * * * *